United States Patent
Zhang et al.

(10) Patent No.: US 7,023,631 B2
(45) Date of Patent: Apr. 4, 2006

(54) BI-FREQUENCY SERVO PATTERN

(75) Inventors: Huaan Zhang, Eden Prairie, MN (US); Alexei Sacks, Edina, MN (US)

(73) Assignee: Seagate Technology LLC, Scotts Valley, CA (US)

(*) Notice: Subject to any disclaimer, the term of this patent is extended or adjusted under 35 U.S.C. 154(b) by 86 days.

(21) Appl. No.: 10/455,688

(22) Filed: Jun. 5, 2003

(65) Prior Publication Data

US 2004/0090693 A1 May 13, 2004

Related U.S. Application Data

(60) Provisional application No. 60/424,580, filed on Nov. 7, 2002.

(51) Int. Cl.
*G11B 5/02* (2006.01)
*G11B 5/09* (2006.01)

(52) U.S. Cl. .................. 360/29; 360/48; 360/77.08

(58) Field of Classification Search ............... 360/48, 360/29, 77.02, 77.08, 78.12, 78.14, 77.12
See application file for complete search history.

(56) References Cited

U.S. PATENT DOCUMENTS

| | | | |
|---|---|---|---|
| 4,511,938 A * | 4/1985 | Betts ..................... | 360/77.08 |
| 5,477,103 A | 12/1995 | Romano et al. | |
| 5,774,298 A * | 6/1998 | Cheung et al. .......... | 360/77.08 |
| 5,909,330 A * | 6/1999 | Carlson et al. ............ | 360/31 |
| 6,118,604 A * | 9/2000 | Duffy ....................... | 360/48 |
| 6,212,047 B1 | 4/2001 | Payne et al. | |
| 6,243,224 B1 | 6/2001 | Sacks et al. | |
| 6,270,885 B1 | 8/2001 | Hokkyo et al. | |
| 6,426,845 B1 | 7/2002 | Sacks et al. | |
| 6,710,967 B1 * | 3/2004 | Hennecken et al. ..... | 360/77.12 |
| 6,791,774 B1 * | 9/2004 | Albrecht et al. ........... | 360/17 |
| 2003/0197964 A1 * | 10/2003 | Ashikaga et al. ......... | 360/48 |

FOREIGN PATENT DOCUMENTS

WO    WO 99/50840    * 10/1999

* cited by examiner

*Primary Examiner*—David Hudspeth
*Assistant Examiner*—Dan I Davidson
(74) *Attorney, Agent, or Firm*—David K. Lucente; Derek J. Berger

(57) ABSTRACT

A data storage device for retrieving data includes a controllably positionable head and a storage medium having servo information comprising a phase pattern having a first frequency and a PES pattern having a second frequency, the second frequency being different from the first frequency.

14 Claims, 10 Drawing Sheets

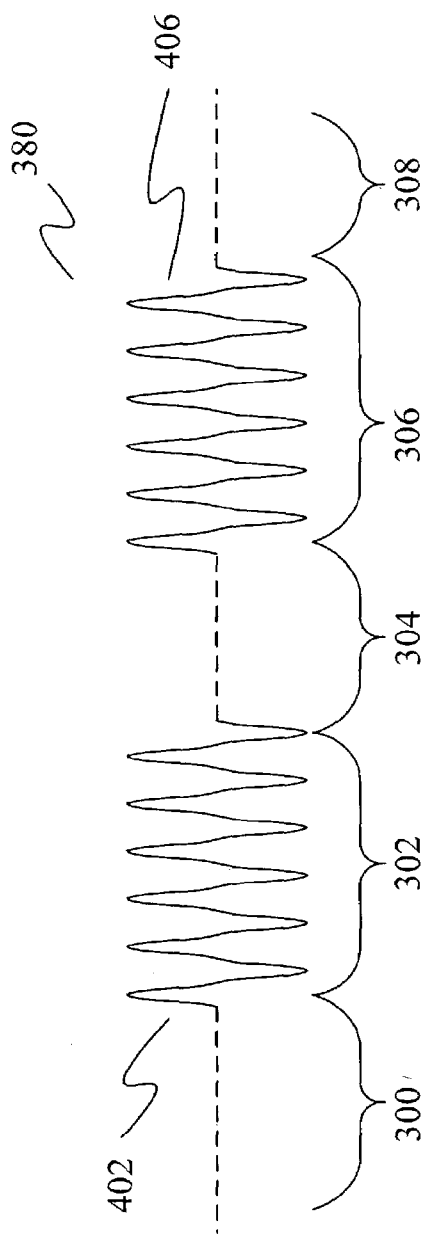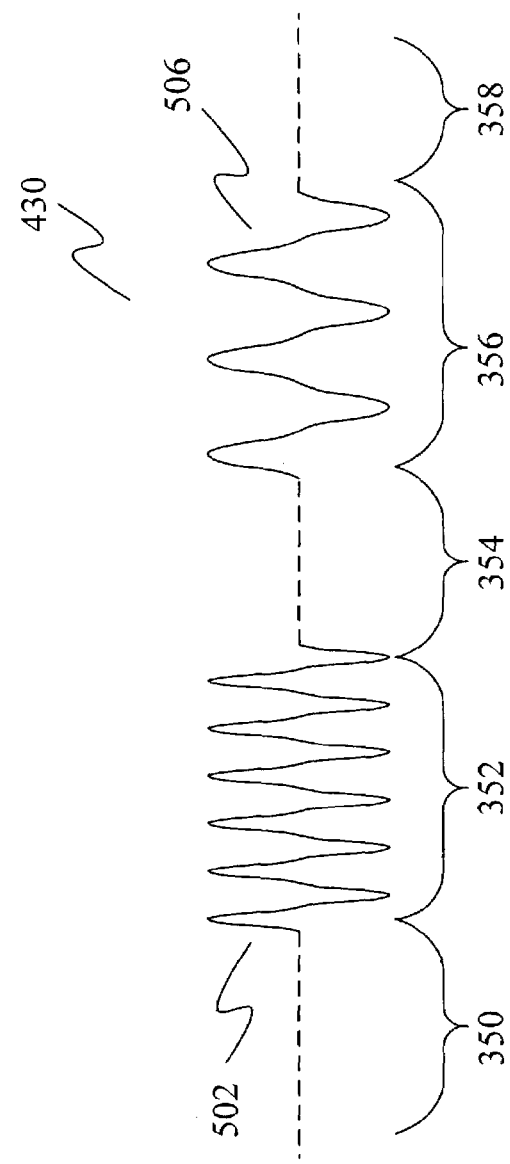
FIG. 7
(PRIOR ART)
FIG. 8

BI-FREQUENCY SERVO PATTERN

CROSS-REFERENCE TO RELATED APPLICATION

This application claims priority from U.S. Provisional Application 60/424,580 filed on Nov. 7, 2002 for inventors Huaan Zhang and Alexei Sacks and entitled BI-FREQUENCY SERVO PATTERN FOR PERPENDICULAR RECORDING.

FIELD OF THE INVENTION

The present invention relates generally to data storage devices, and more particularly but not by limitation to servo patterns for use with storage mediums.

BACKGROUND OF THE INVENTION

A storage device, such as a magnetic disc drive, stores user data and positional information on a recording medium that is divided into a large number of concentric tracks where each track is divided into data and servo sections. Positional information is stored within the servo sections and is read by a magnetic head. This position information includes a phase field, a track identification field, a sector identification filed and a position error field. The phase field is used to synchronize the frequency and phase of a demodulator used to demodulate the remaining fields including the position error field as well as to set an automatic gain control (AGC) for scaling the amplitude of the signal provided to the demodulator. The position error field is used to generate a position error signal, which provides an indication of the location of the magnetic head relative to a particular track center.

The positional information can be recorded on the storage medium by longitudinal recording or perpendicular recording. With longitudinal recording, magnetic fields containing bits of information are oriented longitudinally or parallel to the disc surface. With perpendicular recording, the magnetic fields are oriented perpendicular or normal to the disc surface so that bits of information are stored in an up or down orientation.

Perpendicular recording, although not currently shipped in products, is expected to provide advantages over longitudinal recording, especially as the data density of disc drives increases. However, it has been observed that at relatively large skew angles, perpendicular recording creates large variations in the position error signal.

Embodiments of the present invention provide solutions to these and other problems, and offer other advantages over the prior art.

SUMMARY OF THE INVENTION

A data storage device for retrieving data includes a controllably positionable head and a storage medium having servo information comprising a phase pattern having a first frequency and a PES pattern having a second frequency, the second frequency being different from the first frequency.

Other features and benefits that characterize embodiments of the present invention will be apparent upon reading the following detailed description and review of the associated drawings.

BRIEF DESCRIPTION OF THE DRAWINGS

FIG. 7 is a read signal generated by a read head as it passes over the servo pattern of FIG. 5.
FIG. 8 is a read signal generated by a read head as it passes over the servo pattern of FIG. 6.

DETAILED DESCRIPTION OF ILLUSTRATIVE EMBODIMENTS

Figure 1:
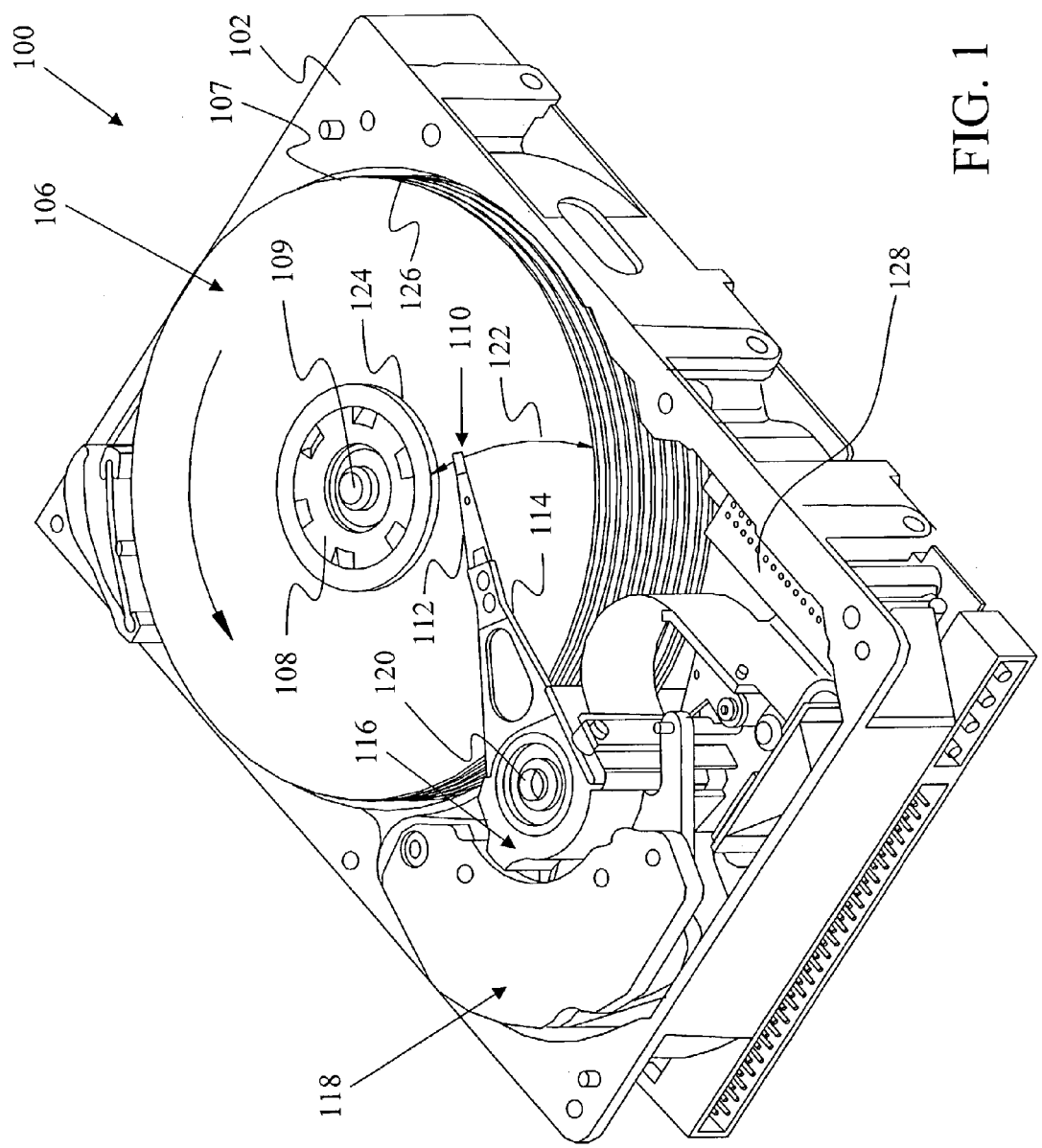
FIG. 1 is an isometric view of a data storage device.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates pivot housing 116 with its attached heads 110 about a pivot shaft 120 to position heads 110 over a desired data track along an arcuate path 122 between a disc inner diameter 124 and a disc outer diameter 126. Voice coil motor 118 is driven by servo electronics, also known as controller, 128 based on signals generated by heads 110 and a host computer (not shown).

Under many embodiments of the present invention, data storage device 100 is a magnetic storage device that stores data and servo information by creating magnetic domains on the storage medium. Within each domain, the magnetic moment of the storage medium is aligned in a single direction. In general the magnetic moments can be aligned either parallel to the disc surface, known as longitudinal recording, or perpendicular to the disc surface, known as perpendicular recording.

Figure 2:
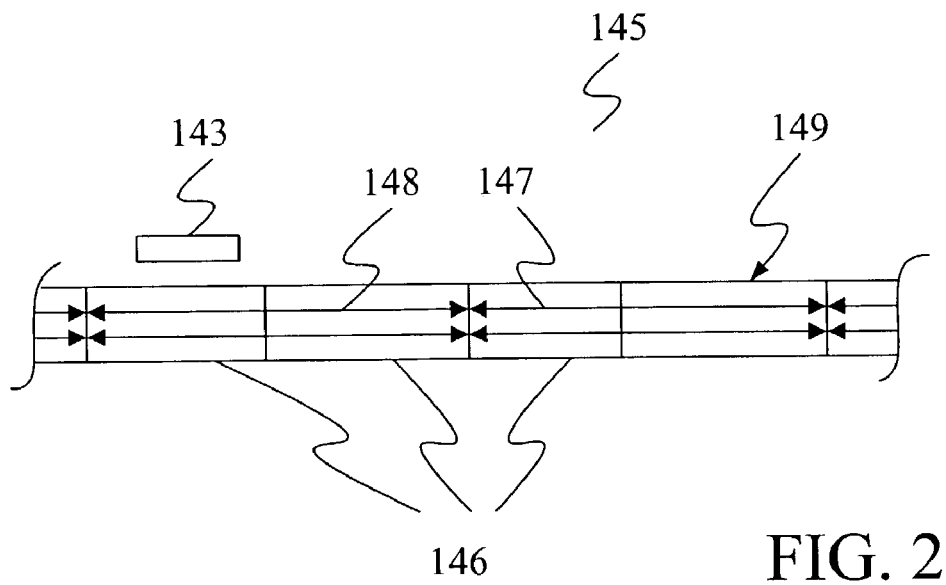
FIG. 2 is an enlarged schematic side view of a head and storage medium using longitudinal recording.

FIG. 2 provides an enlarged partial side view of a disc 145 in which data and servo information is stored by creating magnetic domains 146 using longitudinal recording. As can be seen from FIG. 2, the direction of the magnetic moments, such as magnetic moments 147 and 148 is parallel to the disc surface 149. These magnetic domains are recorded and read using a head 143, which is an example of head 110 of FIG. 1.

Figure 3:
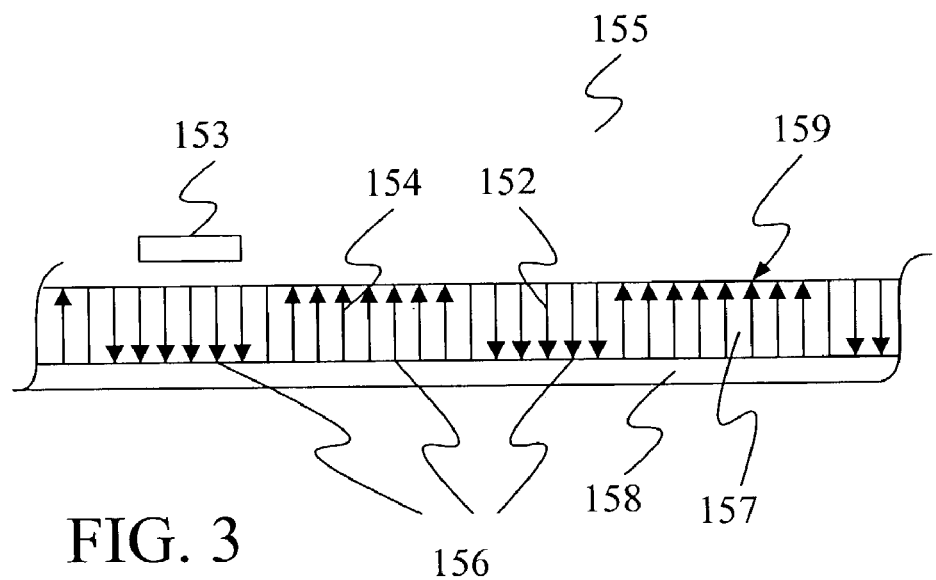
FIG. 3 is an enlarged schematic view of a head and storage medium using perpendicular recording.

FIG. 3 provides an enlarged partial side view of a disc 155 in which data and servo information is stored by creating magnetic domains 156 using perpendicular recording. In FIG. 3, the magnetic moments, such as moments 152 and 154 are perpendicular to disc surface 159. In order to form a magnetic circuit with a head 153, which is an example of head 110 of FIG. 1, a soft magnetic underlayer 158 adjoins media layer 157 opposite head 153. Underlayer 158 provides a path for magnetic flux that flows to and from head 153.

Figure 4:
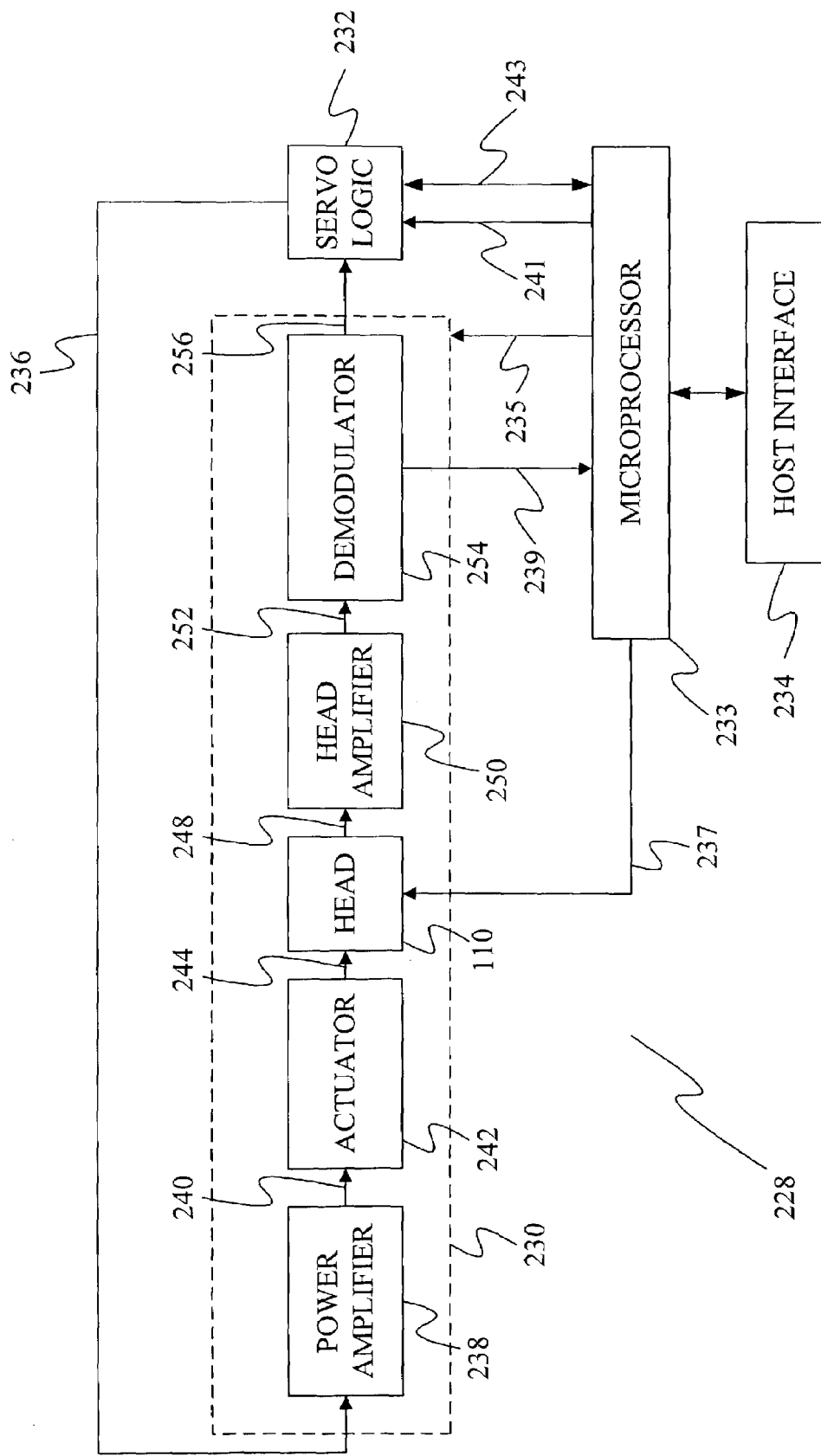
FIG. 4 is a block diagram of a servo loop in a data storage device.

FIG. 4 is a block diagram of a servo loop in a data storage device 228, such as magnetic disc drive 100 of FIG. 1. Storage device 228 includes three main components: plant 230, servo logic 232, and microprocessor 233. Microprocessor 233 communicates with a host computer (not shown) through a host interface 234. Microprocessor 233 controls the reading and writing of information to a disc based on instructions received from the host. Specifically, microprocessor 233 applies control signals through control lines 235 to plant 230 to control various functions of plant 230 including selection of a head, strength of a write current, read sensitivity and mode of operation (read, write, or track seek). In addition, microprocessor 233 provides write data along data bus 237 and receives read data along a data bus 239. The recovered data is provided to the host through host interface 234.

Microprocessor 233 controls the movement of head 110 over disc 107 through servo logic 232, which is connected to microprocessor 233 through an address bus 241 and a bidirectional data bus 243. Using address bus 241 and data bus 243, microprocessor 233 is able to store a desired location for the head in a memory location within servo logic 232. This memory location is accessed by servo logic 232, which issues a current command 236 to plant 230 based upon the difference between the stored value and the current position of the head. Microprocessor 233 is also able to retrieve head position information stored in memory locations of servo logic 232 using address bus 241 and data bus 243.

Within plant 230, current command 236 is received by power amplifier 238, which converts the voltage of current command 236 into current signal 240. Current signal 240 is provided to and controls an actuator 242, which includes voice coil motor 118 of FIG. 1 that is driven by and accelerates at a rate determined by the current of current signal 240. Actuator 242 translates the current of current signal 240 into mechanical movement 244, which moves head 110 relative to the medium.

Head 110 detects data and servo patterns embedded within disc 107 as it moves relative to disc 107. The servo patterns contain information about the position of head 110 relative to disc 107 and cause head 110 to produce low-level signal 248 that contains encoded position information. Head amplifier 250 amplifies low-level signal 248 to produce amplified signal 252, which is less susceptible to noise and which is easier to decode. Amplified signal 252 is input to demodulator 254, which interprets the encoded head signal and supplies a demodulator position measurement 256 to servo logic 232, and data to microprocessor 233 along data line 239.

Servo logic 232 applies demodulator position measurement 256 to a linearity table that relates demodulator position measurement 256 to the actual position of the head to produce a position error value. Thus, servo logic 232 can determine the position of head 110 and issue a new current command 236 based on the position error value which is determined by the difference between the actual head position and its desired position set by microprocessor 233.

There are two basic modes of operation for storage device 228. In one mode, known as track seeking, microprocessor 233 instructs servo logic 232 to move the head across the medium to a new track. In the second mode of operation, known as track following, microprocessor 233 instructs servo logic 232 to keep the head located over a position within a track. Track following is not a completely passive mode since servo logic 232 moves the head in order to keep it steady relative to a track on the medium. This movement is because the tracks include irregularities and servo logic 232 moves head 110 in order to follow these irregularities. During track following, the head is kept in position using the servo loop formed between plant 230 and servo logic 232. Specifically, as head 110 moves off position, low level signal 248 begins to change because the head is reading different parts of the servo patterns embedded in the medium. This change in low level signal 248 causes similar changes in amplified signal 252 and position measurement 256. In response to the change in position measurement 256, servo logic 232 changes current command 236 so that head 110 moves toward its original position over the track.

The present invention provides servo fields that generate position error signals with less variation at large skew angles. To do this, the present invention provides a phase field that is recorded at one frequency and a position error field that is recorded at a second frequency that is typically less than the frequency of the phase field.

The present invention may be used with many different types of position error fields including null-type, split burst amplitude, and phase-type. In addition, the present invention may be used with analog and digital demodulators and with synchronous and asynchronous demodulation. Examples of different position error fields and demodulation techniques are described below.

Figures 5, 6:
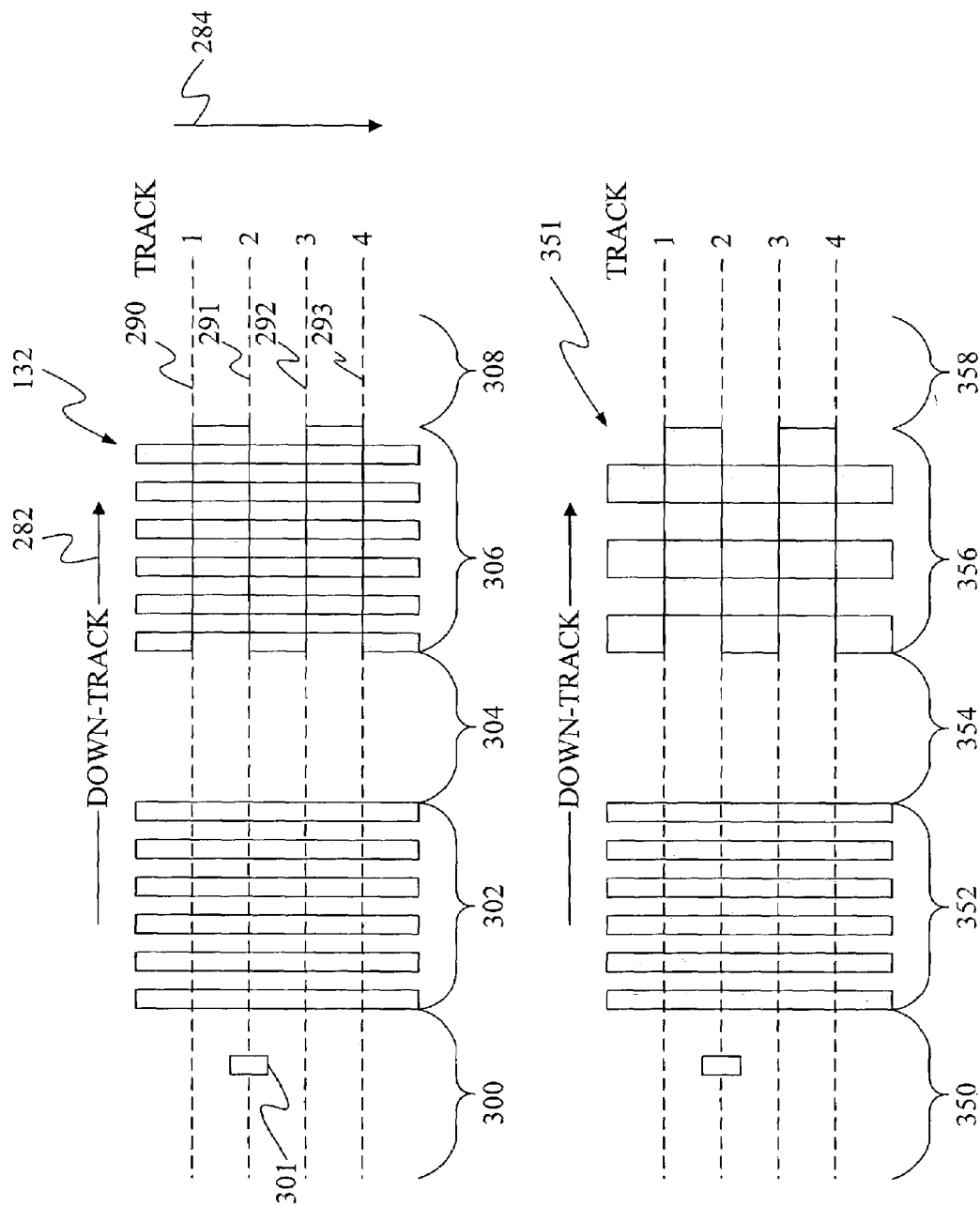
FIG. 5 is a diagram of a null-type servo pattern.
FIG. 6 is a diagram of a null-type servo pattern under an embodiment of the present invention.

FIG. 5 is a diagram showing the essential portions of a servo field 132 with a null-type servo pattern. Arrow 282 indicates a down-track direction, or angular dimension, of the disc. Arrow 284 indicates a cross-track direction, or radial dimension, of the disc. FIG. 5 shows four track centers 290, 291, 292 and 293, which are labeled "1", "2", "3" and "4", respectively. A head 301 is aligned with track center "2" along cross-track direction 284.

The shaded regions in FIG. 5 correspond to regions of opposite magnetic polarity as compared to the non-shaded regions. For example, in a longitudinal recording system, if the longitudinal magnetization in the non-shaded regions were right-to-left in the figure, then the longitudinal magnetization in the shaded regions would be left-to-right. Within these regions, the magnetic medium is saturated in either longitudinal direction, as is standard practice in digital magnetic recording. Similarly, in a perpendicular recording system, if the perpendicular magnetization in the non-shaded regions is oriented up then the perpendicular magnetization in the shaded regions would be oriented down.

Servo field 132 includes leading fields 300, "sync" or "phase" field 302, middle fields 304, position error field 306 and trailing fields 308. Leading fields 300, middle fields 304 and trailing fields 308 may be "empty" as shown in FIG. 5 or may include additional servo data. For example, some of these fields may include a servo address mark (SAM), a sector index mark (SIM), a track number, and/or a sector number. Phase field 302, also referred to as a phase locked loop field, contains radially coherent magnetic transitions. As a head passes over phase field 302, the magnetization pattern within phase field 302 induces an oscillating signal in the output of the head.

Position error field 306 contains a null-type servo pattern. The null-type pattern in position error field 306 is written in a predetermined phase relation to the pattern in phase field 302. Position error field 306 can also include a set of quadrature null patterns (not shown) which are offset by one-half of a track width (and 90 degrees out of phase) with respect to the original, normal null pattern.

A phase-locked loop is typically used to lock onto the phase and frequency of the oscillating signal induced by phase field 302 and to generate a demodulating or mixing signal having a phase that is synchronized with the phase of the oscillating signal. The demodulating signal is then used to rectify the readback signal from position error field 306. The readback signal is rectified by multiplying the readback signal by the demodulating signal; the result is then integrated to produce a position error signal. When the integration is bounded between two points in time, a position error value is produced. Thus, the position error signal is calculated by $$PES = \int R(t)*f(t/T)dt$$

where R(t) is the read back signal of the PES burst, f(t/T) is the demodulating sine or square wave function that has the same frequency and is in-phase with phase field 302. A position error value is calculated when the position error signal is integrated over an integration length which is the product of the number of cycles N of PES field 306 and the pattern period T.

Pattern frequency is the inverse of period T or 1/T. High servo pattern frequencies are desirable to reduce the disc area used by the servo pattern while containing the equivalent bits of information. However, as servo frequency increases, the amplitude of the readback signal decreases and the influence of noise on the readback signal is much more apparent.

In many cases, the servo pattern frequency is optimized based on the pulse width of the readback signal. Although this method of optimizing pattern frequency generally works well with longitudinal recording, there are associated problems with perpendicular recording. With perpendicular recording, the position error signal quality is greatly degraded at relatively large skew angles even before the position error pattern frequency reaches an equivalent longitudinal recording frequency.

Generally, the quality of the position error signal can be measured by the variation in the position error signal from section-to-section while keeping the read head on the same location on the track. It has been observed that position error signal variation increases significantly when the position error pattern frequency increases from 30 MHz to 60 Hz especially for systems with perpendicular recording. Since large position error signal variation is undesirable, this effect has limited how high the recording frequency can be and thereby has limited the recording density on the disc.

To overcome these problems, the present invention utilizes position error fields that are recorded at a different frequency than the phase field. This allows the phase field frequency to be set at a value that is optimum for reading servo data in the servo field while allowing a reduced frequency in the position error field thereby reducing variations in the position error signal.

FIG. 6 is a diagram of a servo field 351 with a null-type servo pattern of one embodiment of the present invention. In FIG. 6, leading field 350, phase field 352 middle field 354, and trailing field 358 are the same as fields 300, 302, 304, and 308 in FIG. 5. Position error field 356 of FIG. 6 is similar to position error field 306 of FIG. 5, except that the frequency of the null pattern in field 356 is half the frequency of phase field 352 and has half as many transitions as the null pattern in field 306. Because the frequency of PES field 356 is half the frequency of PES field 306, each cycle of transitions is twice as long in PES field 356 as compared to PES field 306. However, because there are only half as many transitions in PES field 356, the total length of PES field 356 is the same as PES field 306.

FIGS. 7 and 8 show the difference in the read signals generated by the patterns in FIGS. 5 and 6, respectively. In FIGS. 7 and 8, time is shown along the horizontal axis and signal amplitude is shown vertically. Read signal 380 of FIG. 7 includes phase burst 402 from phase field 302 and PES burst 406 from PES field 306. As can be seen, phase burst 402 and PES burst 406 are at the same frequency. Read signal 430 of FIG. 8 includes phase burst 502 and PES burst 506. In FIG. 8, the frequency of phase burst 502 is twice the frequency of PES burst 506.

Although the frequency of PES burst 506 is shown to be half the frequency of phase burst 502 in FIG. 8, in other embodiments, the ratio of these frequencies can be different and can be optimized based on various parameters including the radial position of the servo field. Also, the ratio of the frequencies can be optimized on an individual track or group track basis.

Further, in some embodiments, instead of lowering the frequency of the PES field, the frequency of phase field can be increased. In these embodiments, the frequency of the PES field is set at an optimal value for reading servo data in the servo field. Increasing the frequency of the phase field maintains the entire servo field at the same or shorter overall length while reducing variations in the position error signal. In further embodiments, the frequency of the PES field can be higher than the frequency of the phase field.

Figures 9, 10:
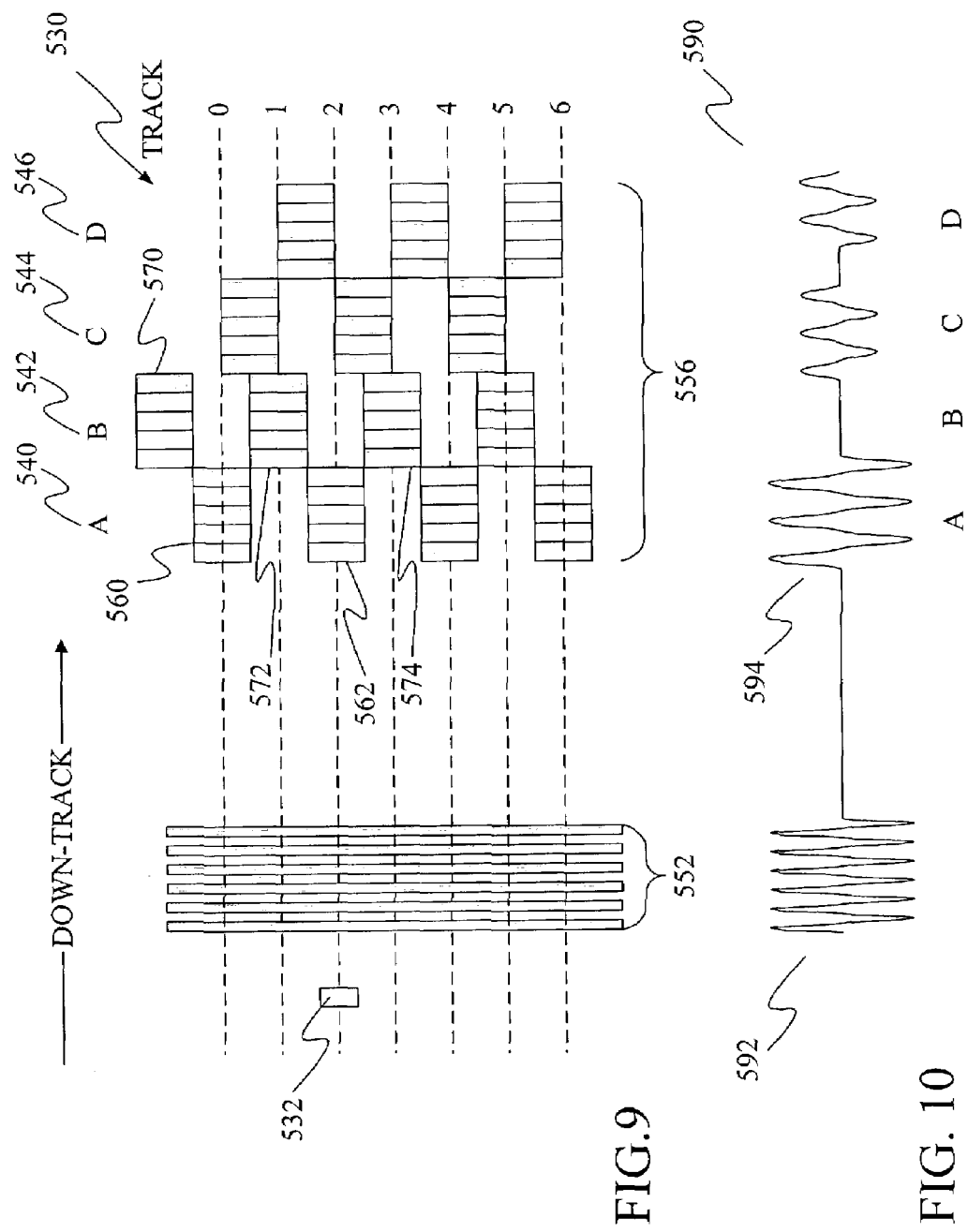
FIG. 9 is a layout of a split burst amplitude servo pattern under one embodiment of the present invention.
FIG. 10 is a read signal generated by a read head as it passes over the servo pattern of FIG. 9.

The present invention is not limited to null-type position error fields and may be used with other types of fields including split burst amplitude and phase-type. For example, FIG. 9 shows a servo field 530 for an embodiment of the present invention in which the position error field is a split burst amplitude pattern. The servo field can be written using longitudinal recording as shown in FIG. 2 or perpendicular recording as shown in FIG. 3. In FIG. 9, the radial dimension of disc 107 is shown vertically and the angular dimension of disc 107 is shown horizontally. The servo field includes phase field 552 and a PES field 556 formed of four split-burst fields 540, 542, 544, and 546, which are labeled A, B, C, and D, respectively. The servo burst fields extend in a radial direction and each includes a plurality of isolated transition areas. For example, servo burst field 540 includes isolated transition areas 560 and 562, and servo burst field 542 includes isolated transition areas 570, 572, and 574. Each isolated transition area includes a series of changes in the direction of the disc's magnetic moment. These changes, or transitions, are aligned in radially extending columns within each transition area such that an entire radial column has the same magnetic moment.

Each burst field's isolated transition areas are radially offset from the transition areas of other burst fields. Specifically, the transition areas in servo burst field 542 are radially offset from the transition areas in servo burst field 540 by a track width; and the transition areas in servo burst field 544 are radially offset from the transitions areas in servo burst field 546 by a track width. Servo bursts 540 and 542 are offset from servo bursts 544 and 546 by half a track width.

Each split burst 540, 542, 544 and 546 is written at a different frequency from phase field 502. In one particular embodiment, each burst is written at half the frequency of the phase field. However, this particular ratio is not required and the ratio between the frequencies may be selected as desired.

As a head, such as head 532, passes circumferentially over the layout of FIG. 9, it produces a servo read signal 590 illustrated in FIG. 10 that can be used to identify the location of the head. Specifically, the signal from the position error field 556 can be used to determine the location of the head within a two-track wide range. Thus, if the position of the head is known to be within tracks 3 or 4 of FIG. 9, the position error signal provides the head's location within those two tracks. Since the radial patterns of the servo burst fields repeat every two tracks, concentric paths that are two tracks apart create the same position error signal. Thus, track 0 and track 2 of FIG. 9 produce the same position error signal.

FIG. 10 provides a diagram of a read signal generated from servo field 530 with amplitude along the vertical axis and time along the horizontal axis. In FIG. 10, read signal 590 includes phase burst 592 and split burst section 594. As shown in FIG. 10, each split burst generates a read signal with a frequency that is different from the frequency of the phase burst 592.

The servo fields of the present invention may be demodulated using any known demodulation technique including analog, digital, asynchronous and synchronous demodulation. FIGS. 11–14 provide examples of demodulators that can be used to demodulate null-type servo patterns of the present invention. Those skilled in the art will recognize that demodulators for split burst amplitude servo fields can similarly be constructed by taking into account the need to modify the frequency of the demodulating signal so that it matches the frequency of the position error field.

Figure 11:
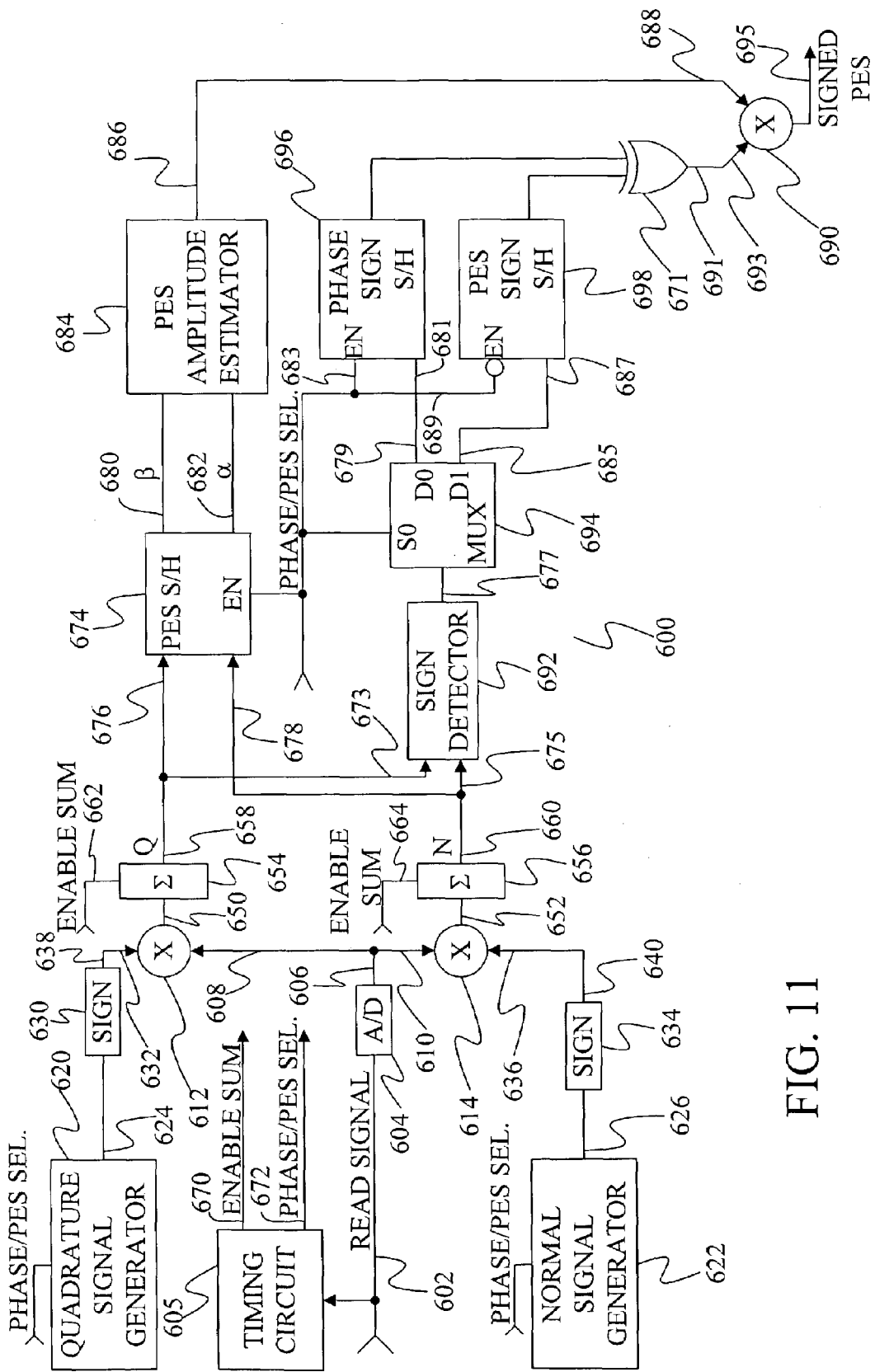
FIG. 11 is a block diagram of an asynchronous digital demodulator circuit of one embodiment of the present invention.

FIG. 11 is a block diagram of an asynchronous, digital demodulator circuit for a null-type pattern according to one embodiment of the present invention. Demodulator circuit 600 has a read signal input 602 that is coupled to analog-to-digital (A/D) converter 604 and timing circuit 605. A/D converter 604 samples the raw read signal received on input 602 at or above the Nyquist rate and converts the samples to a series of digital read values, which are provided to output 606. The digital read values on output 606 are applied to inputs 608 and 610 of multipliers 612 and 614, respectively.

Quadrature signal generator 620 and normal signal generator 622 are each capable of generating two different demodulating signals. During the phase field, signal generators 620 and 622 produce a square wave that oscillates at the frequency of the phase field. During the PES field, signal generators 620 and 622 generate a demodulating square wave that oscillates at the frequency of the PES signal or read signal 602. Under most embodiments, the frequency of the demodulating signals produced by signal generators 620 and 622 are preset based on the expected frequency of a signal read from the phase field and the ratio between the frequency of the PES field and the frequency of the phase field.

To distinguish between the phase field and the PES field, each signal generator receives a phase/PES select signal from timing circuit 605 that indicate when the phase field and the PES field begin.

Although the phase of the quadrature demodulating signal is 90° out of phase with the normal demodulating signal, the phases of the normal and quadrature signals are independent of the phase of the read signal. As such, demodulator 600 is referred to as an "asynchronous" demodulator, and the normal and quadrature demodulating signals are referred to as asynchronous demodulating signals.

Sign circuit 630 is coupled between output 624 of quadrature signal generator 620 and input 632 of multiplier 612. Similarly, sign circuit 634 is coupled between output 626 of normal signal generator 622 and input 636 of multiplier 614. Sign circuits 630 and 634 sample the signs of the quadrature and normal demodulating signals and generate a series of digital sign values on outputs 638 and 640 which are multiplied against the series of digital read samples by multipliers 612 and 636, respectively. The outputs 638 and 640 of circuits 630 and 634 toggle between "positive" and "negative" every half cycle of the quadrature and normal demodulating signals. In an alternative embodiment, quadrature and normal signal generators 620 and 622 generate a series of signed digital words which are digitally multiplied against corresponding digital read samples by multipliers 612 and 614.

Square-wave demodulating signals and sign circuits are fairly simple to implement and provide a high quality position error signal, as described in more detail below. In alternative embodiments, other demodulation signals can be used such as orthogonal sinusoidal waves (sine and cosine). The digital read values could be multiplied by corresponding sampled values of the demodulation signals.

Outputs 650 and 652 of multipliers 612 and 614 provide a plurality of quadrature sample values and normal sample values and are coupled to the inputs of accumulators 654 and 656, respectively. Multipliers 612 and 614 essentially "flip" or "invert" the sign of a digital read value when the sign of the corresponding demodulating signal is negative. When the sign of the corresponding demodulating signal is positive, the sign of the digital read value is not flipped.

Accumulators 654 and 656 accumulate the signed quadrature and normal sample values on outputs 650 and 652 during selected time windows to obtain a scaled quadrature Fourier coefficient estimate on output 658 and a scaled normal Fourier coefficient estimate on output 660. The quadrature and normal Fourier coefficient estimates are labeled "Q" and "N" on outputs 658 and 660, respectively. Accumulators 654 and 656 are enabled during the middle cycles of phase field 302 to accumulate a phase portion of the plurality of quadrature and normal sample values and thereby generate a phase field quadrature Fourier coefficient γ on accumulator output 658 and a phase field normal Fourier coefficient δ on accumulator output 660. Accumulators 654 and 656 are enabled during the middle cycles of position error field 356 to accumulate a position error portion of the plurality of quadrature and normal sample values and thereby generate a position error field quadrature Fourier coefficient β on accumulator output 658 and a position error field normal Fourier coefficient α on accumulator output 660. Accumulators 654 and 656 have enable inputs 662 and 664, which are coupled to enable sum output 670 of timing circuit 605 for enabling each circuit during the desired time windows.

Timing circuit 605 is coupled to read input 602 and activates enable sum output 670 during the middle cycles of phase field 352 and position error field 356. Enable sum output 670 is activated at a predetermined time following detection of a synchronization or servo address mark ("SAM"), for example, in leading field 350 in FIG. 6.

Timing circuit 605 also generates a phase/PES select signal on output 712, which is toggled at a predetermined time following phase field 352 and before PES field 356, as discussed in more detail below.

The phase/PES select signal generated by timing circuit 605 on output 672 is active during phase field 352 and inactive during position error field 356. The phase/PES select signal is used in demodulator 600 to route data and control various sample and hold circuits to account for the fact that the servo bursts from phase field 352 and position error field 356 occur at different times.

As noted above, accumulators 654 and 656 generate two sets of Fourier coefficients on outputs 658 and 660. The phase field Fourier coefficients are generated for the data collected during the phase burst 502 in FIG. 8 and the position error Fourier coefficients are generated during the PES burst 506. Once the phase field and position error field Fourier coefficients are obtained, further signal processing is done to obtain a position error amplitude estimate and a position error direction or sign estimate from the Fourier coefficients.

Position error field sample and hold circuit 674 has inputs 676 and 678, which are coupled to accumulator outputs 658 and 660, respectively. Sample and hold circuit 674 is enabled when the phase/PES select signal on output 672 is inactive. Circuit 674 serves to sample and then hold the position error field Fourier coefficients that are generated by accumulators 654 and 656. Position error field sample and hold circuit 674 feeds these coefficients to inputs 680 and 682 of position error amplitude estimator circuit 684. Amplitude estimator 684 generates a position error amplitude or magnitude estimate based on the position error field Fourier coefficients stored in circuit 674. The position error amplitude estimate generated on output 686 is applied to input 688 of multiplier 690.

The overall sign or direction of the position error is generated by sign detector circuit 692, demultiplexer 694, phase field sign sample and hold circuit 696, position error field sign sample and hold circuit 698, and exclusive-OR (XOR) gate 671. Sign detector circuit 692 has inputs 673 and 675, which are coupled to outputs 658 and 660, respectively, of accumulators 654 and 656. Sign detector circuit 692 has a sign output 677 which is coupled to the input of demultiplexer 694.

During the time window in which the phase field Fourier coefficients are present on accumulator outputs 658 and 660, sign detector circuit 692 determines the sign of at least one of the coefficients and applies a phase field sign value (e.g., a logical "0" or "1") to sign output 677. Since the phase/PES select signal is active, demultiplexer 694 routes the phase field sign value to demultiplexer output 679, which is coupled to data input 681 of phase field sign sample and hold circuit 696. Sample and hold circuit 696 samples and then holds the phase field sign value based on the phase/PES select signal provided to enable input 683.

During the time window in which the position error field Fourier coefficients are present on accumulator outputs 658 and 660, sign detector circuit 692 determines the sign of at least one of the coefficients and applies a position error field sign value (e.g., a logical "0" or "1") to sign output 677. Since phase/PES select signal is inactive, demultiplexer 694 routes the phase field sign value to demultiplexer output 685, which is coupled to data input 687 of position error field sign sample and hold circuit 698. Sample and hold circuit 698 samples and then holds the position error field sign value based on the phase/PES select signal provided to enable input 689.

Sample and hold circuits 674, 696 and 698 can include latches or flip-flops, for example, and can be level-triggered or edge-triggered as desired. Timing circuit 605 can be modified as desired to generate the appropriate edge or level on phase/PES select output 672 during the correct time window as is known in the art.

The outputs of sample and hold circuits 696 and 698 are coupled to the inputs of XOR gate 671, which compares the relative sign values. The result of XOR gate 671 on output 691 produces the overall sign or direction of the head position error. Output 691 of XOR gate 671 is coupled to input 693 of multiplier 690. In one embodiment, multiplier 690 multiplies the overall position error sign value on input 693 with the position error amplitude estimate on input 688 to generate a signed position error estimate on output 695. In an alternative embodiment, multiplier 690 simply appends the position error sign value as a sign bit to the position error amplitude estimate.

The signed position error estimate generated by demodulator 600 is used by microprocessor 233 through servo logic 232 (shown in FIG. 4) to control the radial position of head 110 relative to the desired track position.

Figure 12:
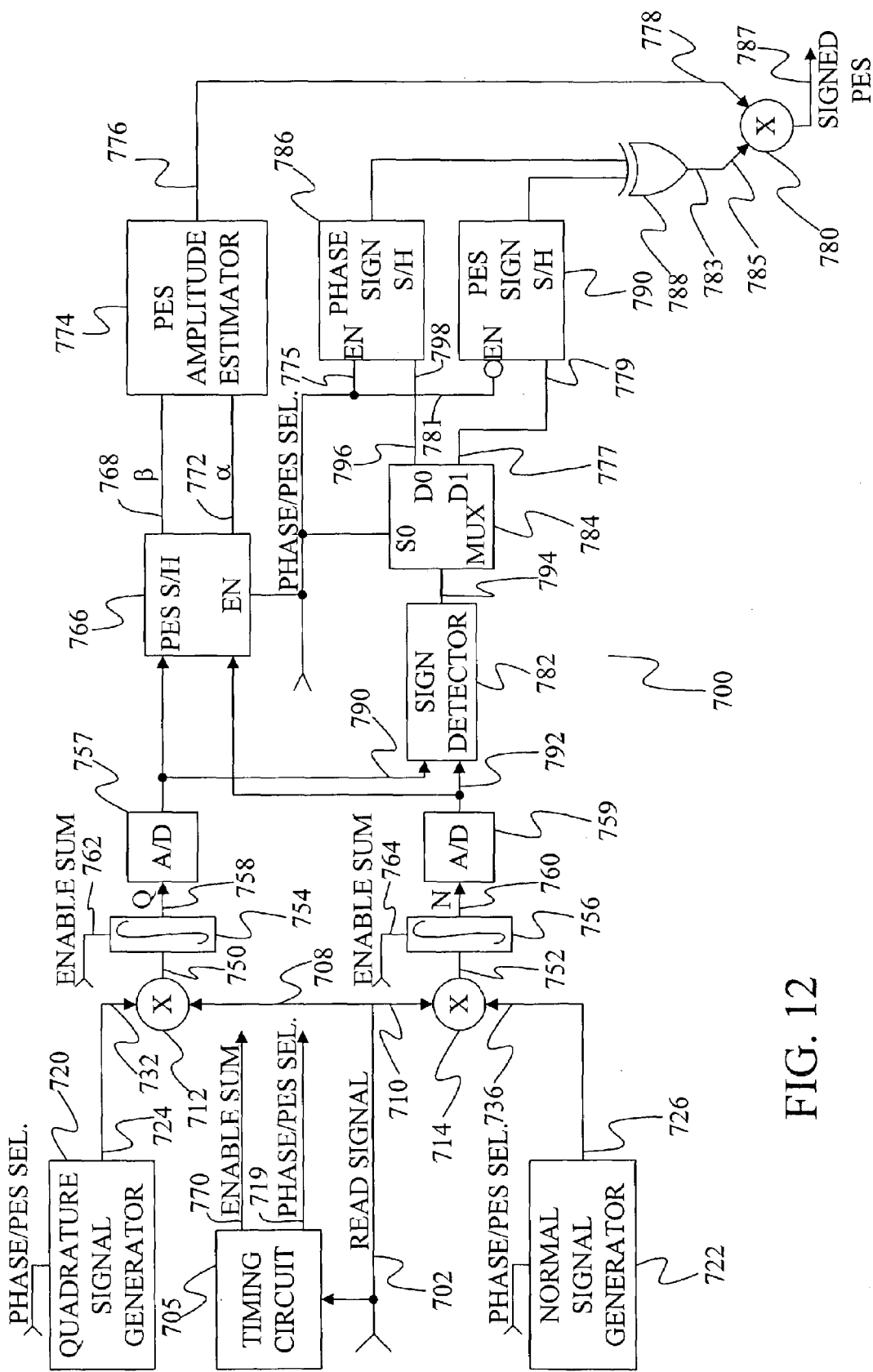
FIG. 12 is a block diagram of an asynchronous analog demodulator circuit of one embodiment of the present invention.

FIG. 12 is a block diagram of an asynchronous, analog demodulator circuit 700 for a null-type pattern according to another embodiment of the present invention. Demodulator circuit 700 has a read signal input 702, which is coupled to a timing circuit 705 and inputs 708 and 710 of multipliers 712 and 714, respectively.

A quadrature signal generator 720 and normal signal generator 722 generate quadrature and normal demodulating signals, respectively, at the frequency of the phase signal during the phase field and at the frequency of the PES signal during the PES field in a manner similar to that described above for quadrature signal generator 620 and normal signal generator 622 of FIG. 11.

Square-wave demodulating signals are fairly simple to implement and provide a high-quality position error signal, as described in more detail below. In alternative embodiments, other demodulation signals can be used such as orthogonal sinusoidal waves (sine and cosine).

Outputs 724 and 726 of signal generators 720 and 722, respectively, are attached to respective inputs 732 and 736 of multipliers 712 and 714. Thus, multipliers 712 and 714 multiply the read signal by the respective demodulating signal received at their respective other inputs. This produces a normal position signal on output 752 of multiplier 714 and a quadrature position signal on output 750 of multiplier 712.

Outputs 750 and 752 of multipliers 712 and 714 are coupled to the inputs of integrators 754 and 756, respectively. Integrators 754 and 756 integrate the position signals on outputs 750 and 752 during selected time windows to obtain a quadrature Fourier coefficient on output 758 and a normal Fourier coefficient on output 760. The quadrature and normal Fourier coefficients are labeled "Q" and "N" on outputs 758 and 760, respectively. Integrators 754 and 756 are enabled during the middle cycles of phase field 352 to integrate a phase portion of the quadrature and normal sample signals and thereby generate a phase field quadrature Fourier coefficient $\gamma$ on integrator output 758 and a phase field normal Fourier coefficient $\delta$ on integrator output 760. Integrators 754 and 756 are later enabled during the middle cycles of position error field 356 to integrate a position error portion of the quadrature and normal position signals and thereby generate a position error field quadrature Fourier coefficient $\beta$ on integrator output 758 and a position error field normal Fourier coefficient $\alpha$ on integrator output 760.

Integrators 754 and 756 have enable inputs 762 and 764, which are coupled to enable sum output 770 of timing circuit 705 for enabling each circuit during the desired time windows.

Timing circuit 705 is coupled to read input 702 and activates enable sum output 770 during the middle cycles of phase field 352 and position error field 356. Enable sum output 770 is activated at a predetermined time following detection of a synchronization or servo address mark ("SAM").

Timing circuit 705 also generates phase/PES select signal 719, which is active during phase field 352 and inactive during position error field 356. PES select signal 719 is used in demodulator 700 to route data and control various sample and hold circuits to account for the fact that the phase burst 502 and PES burst 506 from phase field 356 and position error field 356, respectively, occur at different times.

Analog-to-digital converters 757 and 759 are coupled to integrator outputs 758 and 760, respectively, and convert the analog Fourier coefficients produced by integrators 754 and 756 into digital Fourier coefficients. The digital values produced by analog-to-digital converters 757 and 759 are provided to position error field sample and hold circuit 766, which is enabled when the phase/PES select signal 719 is inactive. Circuit 766 serves to sample and then hold the digital position error field Fourier coefficients that are generated by analog-to-digital converters 757 and 759. Position error field sample and hold circuit 764 feeds these coefficients to inputs 768 and 772 of position error amplitude estimator circuit 774. Amplitude estimator 774 generates position error amplitude or magnitude value based on the position error field Fourier coefficients stored in circuit 766. In one embodiment, circuit 774 generates the position error amplitude value using a square root of the sum of the square circuit.

The position error amplitude value generated on output 776 is applied to input 778 of multiplier 780. The overall sign or direction of the position error is generated by sign detector circuit 782, demultiplexer 784, phase field sign sample and hold circuit 786, PES field sign sample and hold circuit 790, and exclusive-OR (XOR) gate 788. Sign detector circuit 782 has inputs 790 and 792, which are coupled to the outputs of analog-to-digital converters 757 and 759, respectively. Sign detector circuit 782 has a sign output 794, which is coupled to the input of demultiplexer 784.

During the time window in which the phase field Fourier coefficients are present on the outputs of analog-to-digital converters 757 and 759, sign detector circuit 782 determines the sign of at least one of the coefficients and applies a phase field sign value (e.g., a logical "0" or "1") to sign output 794. Since the phase/PES select signal is active, demultiplexer 784 routes the phase field sign value to demultiplexer output 796, which is coupled to data input 798 of phase field sign sample and hold circuit 786. Sample and hold circuit 786 samples and then holds the phase field sign value in response to phase/PES select signal 719 provided at its enable input 775.

During the time window in which the position error field Fourier coefficients are present on the outputs 758 and 760, sign detector circuit 782 determines the sign of at least one of the coefficients and applies a position error field sign value (e.g., a logical "0" or "1") to sign output 794. Since phase/PES select signal 719 is inactive, demultiplexer 784 routes the position error field sign value to demultiplexer output 777, which is coupled to data input 779 of position error field sign sample and hold circuit 790. Sample and hold circuit 790 samples and then holds the position error field sign value in response to phase/PES select signal 719 provided to inverting enable input 781.

Sample and hold circuits 766, 786 and 790 can include latches or flip-flops, for example, and can be level-triggered or edge-triggered as desired. Timing circuit 705 can be modified as desired to generate the appropriate edge or level on phase/PES select signal 719 during the correct time window as is known in the art.

The outputs of sample and hold circuits 786 and 790 are coupled to the inputs of XOR gate 788, which compares the relative sign values of the coefficients. The result of XOR gate 788 on output 783 represents the overall sign or direction of the head position error. Output 783 of XOR gate 788 is coupled to input 785 of multiplier 780. In one embodiment, multiplier 780 converts any zeros on input 785 into a negative one and multiplies the overall position error sign value on input 785 with the position error amplitude value on input 778 to generate a signed position error value on output 787. In an alternative embodiment, multiplier 781 simply appends the position error sign value on input 785 as a sign bit to the position error amplitude value.

The signed position error value generated by demodulator 700 is used by microprocessor 233 through servo logic 232 (shown in FIG. 4) to control the radial position of head 110.

Figure 13:
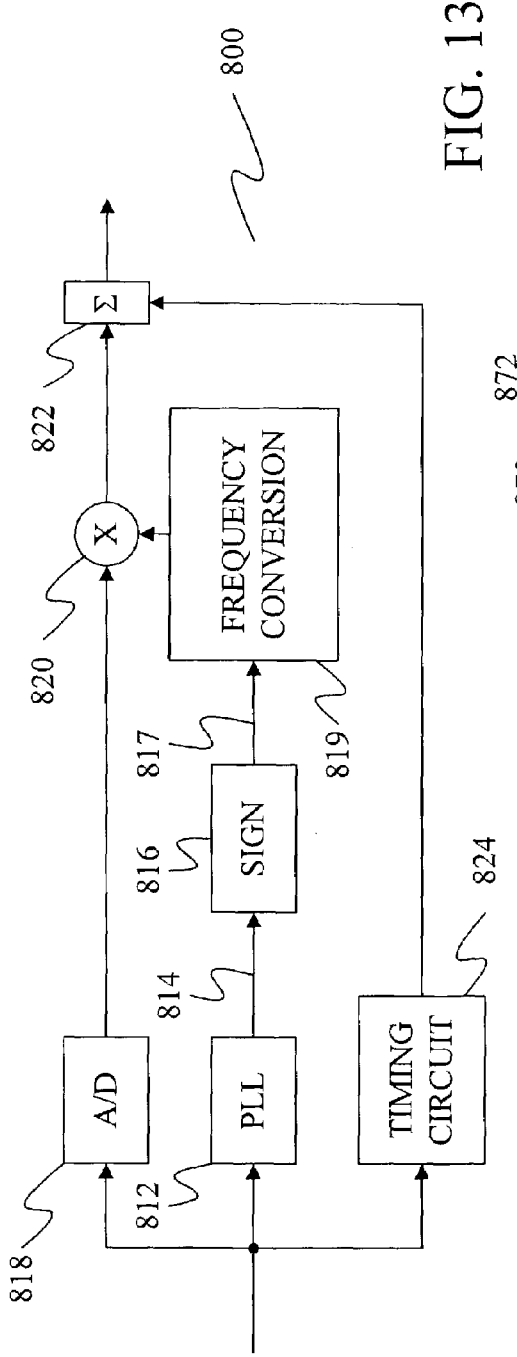
FIG. 13 is a block diagram of a synchronous digital demodulator circuit of one embodiment of the present invention.

FIG. 13 is a block diagram of a synchronous digital demodulator 800, which is another embodiment of a demodulator that can be used with the present invention. In demodulator 800, a gain adjusted read signal is provided to a phase locked loop 812, which generates a clock signal 814 based on the phase field portion of the read signal, such as phase burst 352 of FIG. 8. The sign of the clock signal is determined by a signum circuit 816, which provides a digital value representative of the sign of clock signal 814.

Signum circuit output 817 is input to frequency converter 819, which converts the signal on output 817 from a signal having the frequency of phase field 352 to a signal having the frequency of PES field 356. For a simple embodiment in which the frequency of the position error field is half the frequency of the phase field, this can be achieved by using a D-flip flop.

Preferably, frequency converter 819 operates by generating an output signal that is some ratio of the input signal. This ensures that the demodulating signal is based on the frequency of the phase burst actually read from the disc.

The position error field signal is sampled and converted into a series of digital values by an analog-to-digital converter 818. The series of digital values is then rectified by the values generated by frequency converter 819 through a multiplier 820, which multiplies the output values of frequency converter 819 by the series of digital signal values. A series of product values produced by multiplier 820 are input to a summer 822, which sums together the values over a period of time set by timing circuit 824. In most systems, the product values are summed over a period of time associated with the central part of the position error field signal. The sum produced by summer 822 is the position error value.

Figure 14:
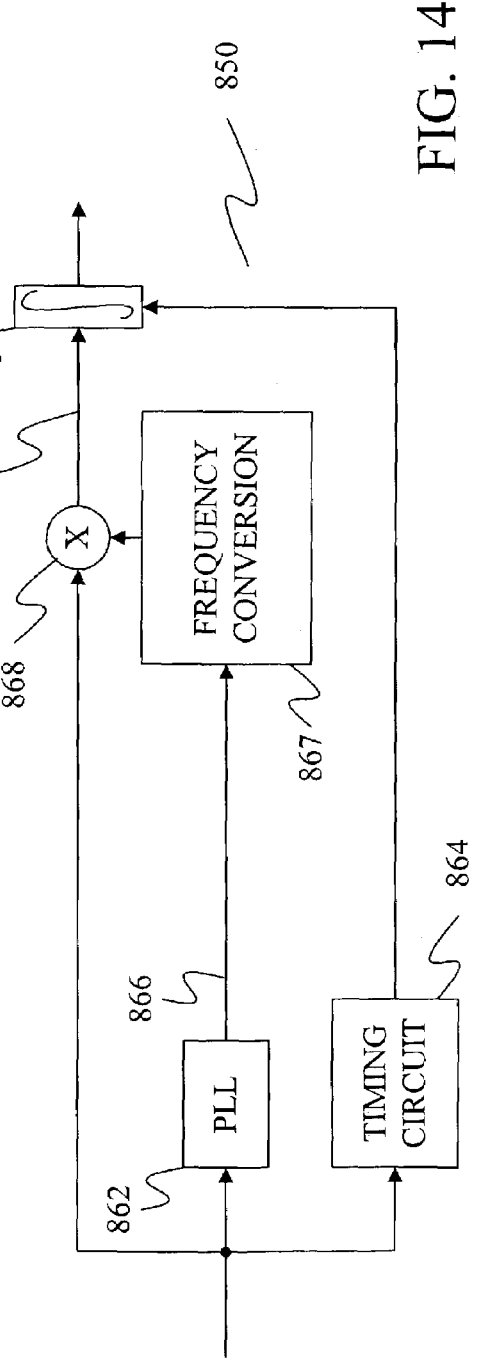
FIG. 14 is a block diagram of a synchronous analog demodulator circuit of one embodiment of the present invention.

FIG. 14 is a block diagram of synchronous analog demodulator 850 that represents one embodiment of a demodulator that may be used with the present invention.

A read signal is provided to a phase locked loop 862 and a timing circuit 864. Phase locked loop 862 uses phase burst 502 in the read signal to create a clock output 866 that is typically a square wave synchronized to the phase and the frequency of the phase field signal. Phase locked loop 862 continues to generate clock signal 866 based on the phase burst even after the phase burst ends and the position error burst begins. In the present invention, the clock signal is input to frequency converter 867 to generate a demodulating signal having a frequency equal to PES burst 506, which is different than the frequency of phase burst 502. In most embodiments, frequency converter 867 operates by determining the frequency for the demodulating signal based on the frequency of the input clock signal so that the demodulating signal is based on the actual frequency of the phase burst.

Multiplier 868 multiplies the position error signal by the demodulating signal to produce a product signal 870. Product signal 870 represents a rectified version of the position error signal. Product signal 870 is provided to an integrator 872, which receives timing control signals from timing circuit 864. The timing control signals cause integrator 872 to integrate product signal 870 over some portion of the period of time associated with the position error signal.

The position error signal is thus calculated as:

$$PES = \int R(t) * f(t/nT) dt$$

where R(t) is the read back signal of the PES burst, and f(t/nT) is the demodulating sine wave frequency or square wave function with an optimized frequency of $$\frac{1}{nT}$$

where $$\frac{1}{T}$$

is the frequency of the phase burst signal and $$\frac{1}{n}$$

is a conversion factor for converting from the phase frequency to the position error frequency. For example, if $$\frac{1}{n} = \frac{1}{2},$$

the frequency of the demodulating signal is half the frequency of the phase burst.

Figure 15:
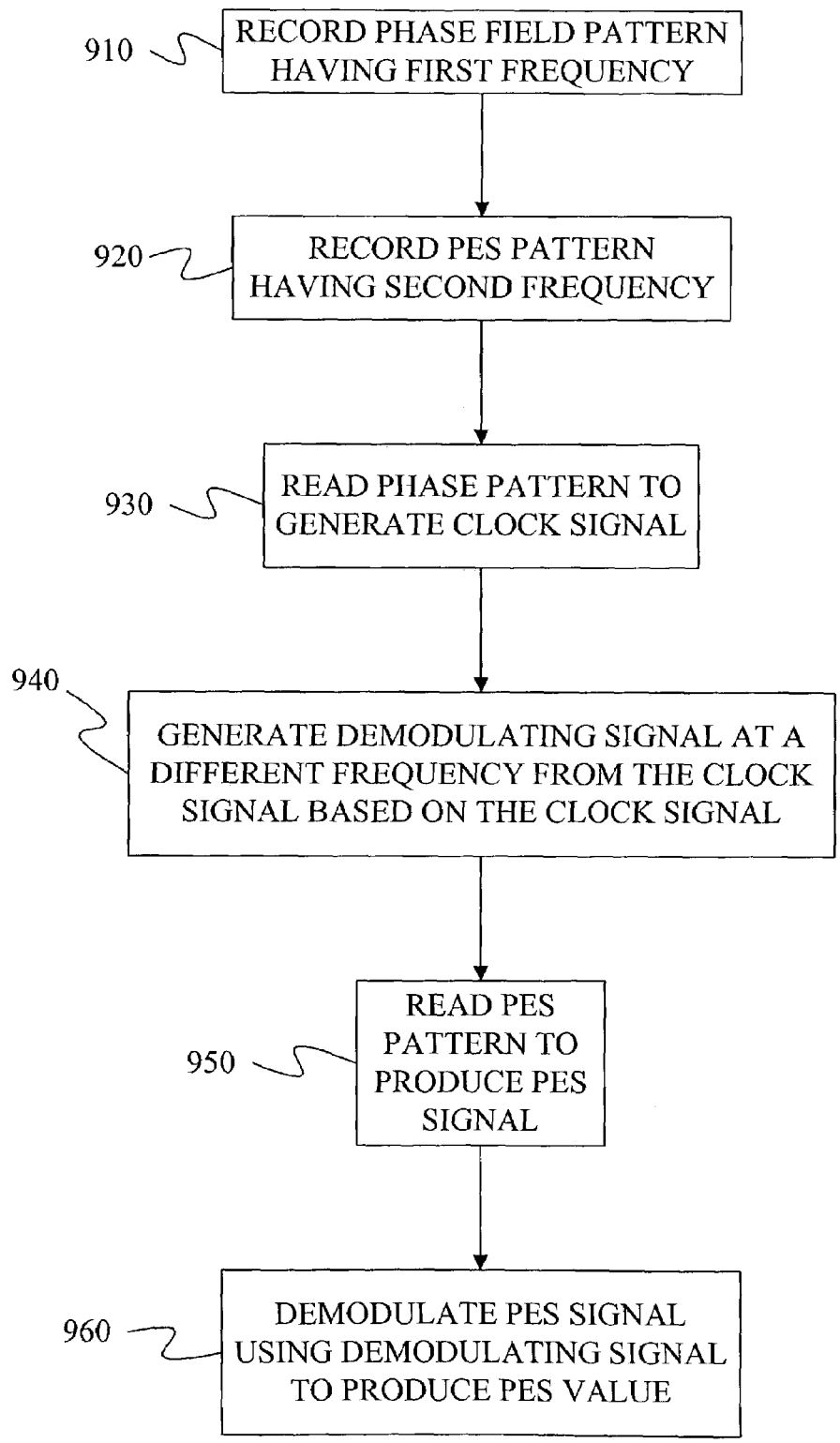
FIG. 15 is a block diagram of a method of the present invention.

FIG. 15 is a block diagram illustrating a method of one embodiment of the present invention. Step 910 involves recording a phase field pattern 352, 552 with a first frequency in a servo field. The recording can be either longitudinal recording as illustrated in FIG. 2 or perpendicular recording as illustrated in FIG. 3.

Step 920 comprises recording a PES pattern 356, 556 in the servo field down-track of phase pattern 352, 552. PES pattern 356, 556 is recorded at a second frequency that is different than the first frequency. In most cases, the second frequency is less than the first frequency.

At step 930, the phase pattern is read to generate a clock signal. This clock signal is then used in step 940 to generate a demodulating signal at a different frequency from the clock signal. The PES field is then read at step 950 to generate a PES signal. At step 960, the PES signal is demodulated using the demodulating signal to produce a PES value.

In summary, a data storage device for retrieving user data is provided, where the data storage device includes a controllably positionable head 110 and a storage medium 107 having servo information. The servo information includes a phase pattern 352, 552 having a first frequency and a PES pattern 356, 556 having a second frequency, the second frequency being different from the first frequency.

A method of storing servo information on a data storage device 100 is also provided. The method includes recording a phase field pattern 352, 552 having a first frequency and recording a PES pattern 356, 556 having a second frequency that is different from the first frequency.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the bi-frequency servo pattern disc drive system while maintaining substantially the same functionality without departing from the scope and spirit of the present invention. In addition, although the preferred embodiment described herein is directed to a bi-frequency servo pattern disc drive system for magnetic recording, it will be appreciated by those skilled in the art that the teachings of the present invention can be applied to optical recording and magneto-optical recording, without departing from the scope and spirit of the present invention.

What is claimed is:

1. A storage medium having servo information comprising a phase pattern having a first frequency and an associated position pattern having a second frequency, the second frequency being different from the first frequency, the position pattern being one of a set of position patterns consisting of a null-type servo pattern and a split burst amplitude pattern, the storage medium further comprising a demodulator that uses a demodulator signal that has a frequency that is based on a relationship between the first frequency and the second frequency.

2. The medium of claim 1 wherein the demodulator is a digital demodulator.

3. The medium of claim 1 wherein the demodulator is synchronous.

4. The medium of claim 1 wherein the demodulator is asynchronous.

5. The medium of claim 1 wherein the demodulator is an analog demodulator.

6. The medium of claim 1 wherein the frequency of the position pattern is less than the frequency of the phase pattern.

7. The medium of claim 1 wherein the frequency of the position pattern is greater than the frequency of phase pattern.

8. The medium of claim 1 wherein the position pattern is recorded using perpendicular recording.

9. The medium of claim 1 wherein the second frequency of the position pattern varies with a radial position of the servo information on the storage medium.

10. A method comprising:
recording a phase pattern having a first frequency;
recording an associated position pattern having a second frequency, the second frequency being different from the first frequency;
reading the position pattern to produce a position signal;
using a relationship between the first frequency and the second frequency to generate a demodulating signal; and
demodulating the position signal using the demodulating signal to produce a position error value.

11. The method of claim 10 wherein the second frequency is less than the first frequency.

12. The method of claim 10 wherein recording comprises perpendicular recording.

13. A device comprising:
a positioning block coupled to a head for receiving a phase signal generated from a phase field having a first frequency and receiving an associated position signal generated from a position field having a second frequency, the second frequency being different from the first frequency, and for using the phase signal and a relationship between the first frequency and the second frequency to produce a demodulating signal and using the demodulating signal to demodulate the position signal to generate a position error value.

14. The data storage device of claim 13 wherein the second frequency is less than the first frequency.

* * * * *